March 13, 1956
R. E. NOVKOV
2,737,705
HOLDER FOR PARTING TOOL AND SHANK
Filed July 6, 1954
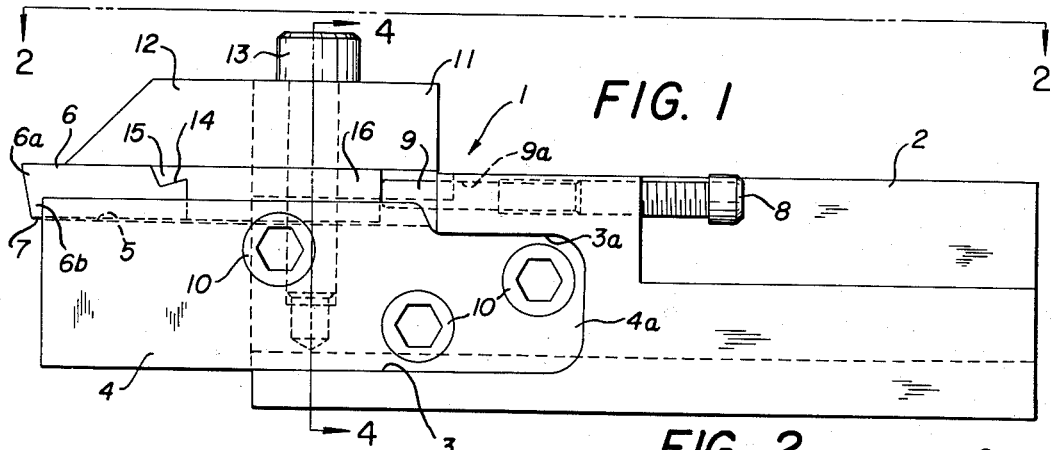
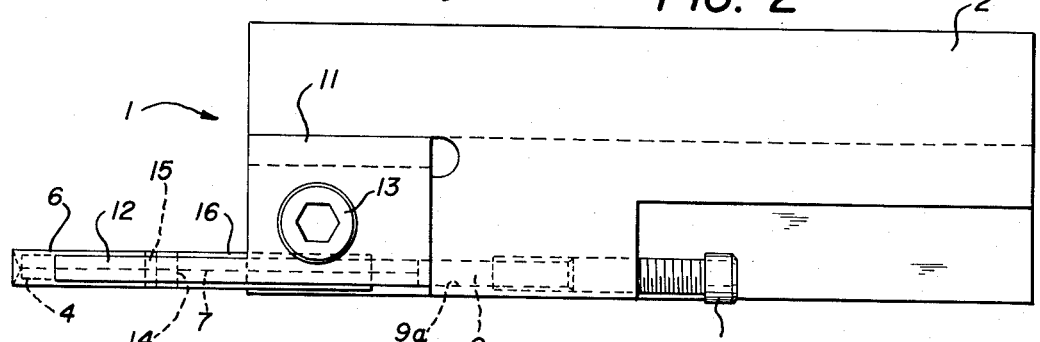
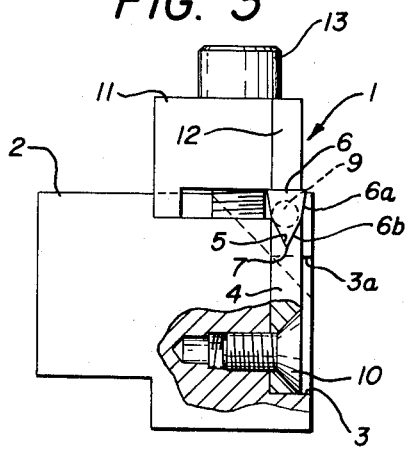
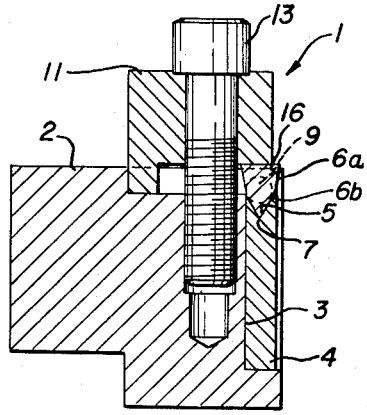
*INVENTOR.*
RAYMOND E. NOVKOV
BY
*Oldham & Oldham*
*ATTORNEYS*

United States Patent Office 2,737,705
Patented Mar. 13, 1956

2,737,705

HOLDER FOR PARTING TOOL AND SHANK

Raymond E. Novkov, Akron, Ohio, assignor to Manchester Machine and Tool Company, Akron, Ohio, a corporation of Ohio Application July 6, 1954, Serial No. 441,305

4 Claims. (Cl. 29—96)

This invention relates to parting tools, and especially to a novel holder adapted to position an inexpensive, efficiently utilized parting tool in a secure, replaceable manner for cutting or parting a work piece into a number of pieces.

The general object of the present invention is to provide a new and improved parting tool holder characterized by the solid, secure positioning of the parting tool and by the ease of removal and subsequent replacement of the parting tool in the same position as previously occupied in the tool holder.

Another object of the invention is to use a replaceable supporting plate which is in special secure engagement with a retainer block and which plate has a positioning recess in its upper edge for accurate positioning of a parting tool having a complementary shape to the recess on the support plate for engagement therewith.

A further object of the invention is to use a backstop or shank member separate from a cutting tool to aid in positioning a cutting tool in its holder.

Another object is to position a parting tool so that substantially the entire tool can be used as the tool wears away but with the parting tool being fixedly and securely positioned at all times.

Yet another object of the invention is to use a special clamp member in combination with a support plate in a parting tool holder for clamping against both the upper and lower surfaces of a parting tool positioned in the holder.

Yet another object of the invention is to provide a secure holder for a parting tool that extends or projects appreciably from the main body or block of the holder but which can position a relatively short tool therein by use of a shank member engaging the tool.

The foregoing and other objects and advantages of the invention will be made more apparent as the specification proceeds.

For a better understanding of the present invention, reference should be had to the accompanying drawings, wherein:

Fig. 1 is an elevation of a parting tool holder illustrating the currently preferred embodiment of the principles of the invention;

Fig. 2 is a plan view of the parting tool holder of Fig. 1 taken on line 2—2 thereof;

Fig. 3 is a front end elevation of the parting tool holder of Fig. 1, with a portion of the holder broken away and shown in section for clarity to show the means for securing the supporting plate in position; and Fig. 4 is a vertical section taken on line 4—4 of Fig. 1.

The present invention, in general, relates to a parting tool holder including a retainer block, a support plate in removable cantilevered engagement with the retainer block, which support plate has a contoured upper edge, a parting tool having a lower edge contoured complementary to the upper edge of said support plate and which lower edge engages such upper edge to be positioned thereby and protrude forwardly from the support plate, a shank engaging a rear portion of the parting tool, and a clamp block removably secured to the retainer block and having an extension arm or other portion engaging the parting tool and the shank to secure them on the support plate and to permit relatively short parting tools to be used.

In the following specification and the accompanying drawings, corresponding numerals are used to refer to corresponding parts to facilitate comparison between the drawings and specification.

In order to understand the invention in detail, attention now is directed to the accompanying drawings and the partig tool holder of the invention is indicated as a whole by the numeral 1. This parting tool holder 1 includes a carrier, support or retainer block 2 of suitable construction for engagement with a conventional machine tool, such as the turret of a turret lathe and this retainer block 2 is adapted to position the remainder of the elements of the tool holder of the invention thereon. The retainer block 2 has a shallow recess 3 formed in one upper lateral surface thereof and extending to a forward or front margin of the retainer block 2. The recess 3 also extends to an upper surface of the retainer block 2 at the front end thereof whereas a reduced height lower portion 3a is provided in this recess adjacent the rear end thereof. A support plate 4, usually substantially of the thickness corresponding to the depth of the recess 3 in the block 2, is provided and is shaped complementary at the rear portion thereof for engagement with the recesses 3 and 3a for removable engagement with the retainer block 2 as hereinafter described.

It is an important feature of the invention that the support plate 4 extends forwardly from the retainer block 2 an appreciable distance and that the upper edge of the support plate 4 is provided with a special shape which in this instance comprises a V-shaped recess 5 formed in the upper edge of the support plate 4 and extending the total exposed length thereof. The support plate 4 has a reduced height back portion 4a which engages the recess 3a in the block and the recess 5, of course, is not formed in such portion of the support plate.

The parting tool holder 1 is adapted to position a parting tool 6 therein, which tool usually is made from tungsten carbide or other very hard metallic material for use in rapid and effective cutting work with a minimum of maintenance or sharpening of the parting tool 6. It is important that the parting tool 6 have a lower surface shaped complementary to the upper surface of the support plate 4 so that the parting tool 6 is shown as having a V-shaped lower edge 7 which is seated in the recess 5 in the upper edge of the support plate. Hence the parting tool 6 is accurately located laterally with relation to such support plate 4 and the remainder of the parting tool holder 1.

As an important feature of the invention, it will be seen that the parting tool 6 has a section removed from the rear portion thereof to provide a reduced height part 14 on the tool. Such part 14 is adapted to register with and engage an end 15 on a shank 16 provided to aid in positioning the parting tool 6. It will be seen that the registering or engaging portions of the parting tool and the shank 16 are irregular in shape and engage to prevent any forward movement of the tool 6 with relation to the shank 16. In this instance, the end 15 is of reduced height or size where secured to the shank 16 so that a wedged engagement with the tool 6 is provided. In all events, the engaging portions of the parting tool and shank are complementary to each other and may be considered to be in hooked engagement, while obviously the main portions of the parting tool 6 and shank 16 are of the same height and any desired interfitting sections can be provided on the tool and shank. The lower edge of the shank 16 preferably is complementary in shape to the recess 5 in the support plate 4. If desired, the shank 16, which may be made from any suitable material, may be brazed or welded to the parting tool 6.

The position of the parting tool longitudinally with relation to the support plate 4 is controlled by a conventional screw control 8 that is in threaded engagement with a portion of the retainer block 2 and controls the position of a spacer or dowel pin 9 in sliding engagement with a hole or bore 9a provided in retainer block 2 so that such spacer pin 9 can engage the back portion of the shank 16 to form a stop therefor when positioned on the support plate 4.

While the complementary shapes of the recesses 3 and 3a and support plate 4 aid in retaining the support plate engaged with the retainer block 2, cap screws 10 are also removably engaged with the support plate 2 and extend into tapped bores in the retainer block 2 for removably securing the support plate to such retainer block. Hence the support plate 4 can easily be replaced, if damaged.

The positioning of the parting tool 6 is completed by means of a clamp 11 which has an offset extension arm 12 provided thereon. This clamp 11 is removably secured to the retainer block 2 by a cap screw 13 extending through the clamp and into a tapped bore provided in the block 2 so that the clamp 11 can be positioned with the extension arm 12 thereof in register with and superimposed upon the top surface of the parting tool 6 and the shank 16. This extension arm 12 of the clamp 11 smoothly blends into the main body portion thereof but with the extension arm 12 being adapted to extend substantially the length of the cutting tool in the cantilevered portion of the parting tool holder 1 and hold the shank 16 and tool 6 together.

It should be noted that the parting tool 6 has at least a portion of its cutting edge or surface made wider than either the support plate 4 or the extension arm 12 of the clamp so that such parting tool will cut a groove into a work member of sufficient width that the extension arm 12 and support plate 4 can be received in the groove cut in such work member by the parting tool and still provide the desired reinforced supporting action for the parting tool 6.

When the parting tool requires sharpening or replacing, it is easy to remove such parting tool and later replace it or another tool in the parting tool holder in the identical position to that previously occupied by the parting tool. In other words, the complementary engagement between the parting tool 6 and the support plate 4 permit a relocation of the parting tool in exactly the position that it previously occupied. If the sharpening action has reduced the overall length of the parting tool, then the screw control 8 may be adjusted slightly to push out the parting tool for further cutting action. Should various lengths of parting tools be used in different operations, then a variety of support plates 4 can be provided of different protruding lengths with relation to the retainer block 2. Likewise a variety of the clamps 11 could be provided with different length extension arms 12 thereon.

It will be noted that the parting tool 6 has a small relief angle of, for example, about 5° ground or otherwise provided on the upper sides 6a of the tool. At the lower edge 6b, the parting tool 6 sides have a positioning angle of approximately, for example, 35° provided thereon.

From the foregoing it is submitted that a sturdy, effective type of a parting tool holder has been provided wherein the parting tool 6 is securely positioned and held by the holder for effective cutting action. Substantially the entire length of the parting tool can be used as the cutting end is worn away since the shank 16 engages the tool, and with the clamp arm 12, holds the tool in position. Thus it is contended that the objects of the invention have been achieved.

This application is on an improved parting tool holder similar to that shown in my co-pending application S. N. 414,833.

While one complete embodiment of the invention has been disclosed herein, it will be appreciated that modification of this particular embodiment of the invention may be resorted to without departing from the scope of the invention as defined in the appended claims.

What I claim is:

1. A parting tool holder comprising a retainer block, a clamp having an extension arm protruding therefrom, a support plate, threaded fastening means directly and fixedly securing said support plate to said retainer block, unitary parting tool means of uniform height from end to end thereof and comprising a hard metal tool and a shank secured to said tool at the back end thereof, threaded fastening means securing said clamp to said retainer block on the upper surface thereof to releasably clamp said parting tool means between said clamp and said fixed support plate, both said support plate and the extension arm of said clamp protruding forwardly from said retainer block to reinforce said parting tool means adjacent the cutting surface thereof, and a screw type stop adjustably positioned to engage the inoperative end of said parting tool means to prevent movement thereof away from any work when engaged therewith and to permit accurate repositioning of said parting tool means if removed from the tool holder.

2. A parting tool holder comprising a retainer block having a forward end, a clamp having an extension arm protruding therefrom, a support plate, threaded fastening means directly and fixedly securing said support plate to said retainer block, a parting tool, threaded fastening means securing said clamp to said retainer block to releasably clamp said parting tool between said clamp and said fixed support plate, both said support plate and the extension arm of said clamp protruding forwardly from said retainer block to reinforce said parting tool means adjacent the cutting surface thereof, and an adjustable screw type stop positioned to engage the inoperative end of said parting tool.

3. A parting tool holder comprising a retainer block having a forward end, a clamp having an extension arm protruding therefrom, a support plate, parting tool means consisting of a hard metal parting tool and a shank engaging said tool at the back end thereof, threaded fastening means securing said clamp to said retainer block to clamp said parting tool means against said support plate, both said support plate and the extension arm of said clamp protruding forwardly from said retainer block to reinforce said parting tool means at the cutting surface thereof and at the engagement of said tool and said shank, and an adjustable stop positioned to engage the inoperative end of said parting tool means to prevent movement thereof away from any work.

4. A parting tool holder comprising a retainer block having a forward end, a clamp having an extension arm protruding therefrom, a support plate, threaded fastening means directly and fixedly securing said support plate to said retainer block, parting tool means comprising a hard metal tool and a shank engaged with said tool at the back end thereof, and threaded fastening means securing said clamp to said retainer block to clamp said parting tool means between said clamp and said fixed support plate, both said support plate and the extension arm of said clamp protruding forwardly from said retainer block to reinforce said parting tool means immediately adjacent the cutting surface thereof and at the engagement of said tool and said shank, said extension arm having a downwardly and forwardly inclined upper edge at its forward end to provide a chip breaker surface thereon.

References Cited in the file of this patent

UNITED STATES PATENTS

| | | |
|---|---|---|
| 1,045,512 | Carr | Nov. 26, 1912 |
| 2,254,056 | Anthony | Aug. 26, 1941 |
| 2,398,913 | Anthony | Apr. 23, 1946 |
| 2,453,959 | Anthony | Nov. 16, 1948 |